(12) United States Patent
LaPlace et al.

(10) Patent No.: US 6,778,370 B1
(45) Date of Patent: Aug. 17, 2004

(54) ADAPTIVE RECLOSER/SECTIONALIZER

(75) Inventors: Carl J. LaPlace, Raleigh, NC (US); David G. Hart, Raleigh, NC (US); William M. Egolf, Apex, NC (US)

(73) Assignee: ABB Technology AG, Zurich (CH)

( * ) Notice: Subject to any disclaimer, the term of this patent is extended or adjusted under 35 U.S.C. 154(b) by 88 days.

(21) Appl. No.: 09/810,599

(22) Filed: Mar. 16, 2001

(51) Int. Cl.[7] .............................................. H02H 3/00
(52) U.S. Cl. ............................. 361/71; 361/62; 361/66; 361/74
(58) Field of Search .............................. 361/71, 74, 62, 361/66, 115, 111, 118, 54, 56, 64, 67, 68

(56) References Cited

U.S. PATENT DOCUMENTS

| | | | |
|---|---|---|---|
| 4,535,409 A | 8/1985 | Jindrick et al. ............. 364/481 |
| 4,795,996 A | 1/1989 | Brown et al. ................ 337/169 |
| 5,117,325 A | 5/1992 | Dunk et al. ................... 361/93 |
| 5,612,661 A | 3/1997 | Twenter et al. ............. 337/169 |
| 5,698,831 A | 12/1997 | Abdelgawad et al. ....... 218/138 |
| 5,729,888 A | 3/1998 | Abdelgawad et al. ...... 29/602.1 |
| 5,768,079 A | 6/1998 | Buell ........................... 361/78 |
| 5,784,237 A | 7/1998 | Velez ........................... 361/62 |
| 5,936,495 A | 8/1999 | LeCourt ........................ 335/6 |
| 6,347,027 B1 * | 2/2002 | Nelson et al. ................ 361/64 |
| 6,407,897 B1 * | 6/2002 | Yanniello et al. ............. 361/62 |

OTHER PUBLICATIONS

Cooper Power Systems, Inc., "Kyle® Form 5 Triple–Single Accessory," Bulletin 99012C, Jul. 1999.
Cooper Power Systems, Inc., "Kyle® Form 5 Universal Device Protection Accessory," Bulletin 99012A, Jul. 1999.
Cooper Power Systems, Inc., "Kyle® Form 5 LS/UDP Recloser Control," Bulletin99012B, Jul. 1999.
ABB Distribution Automation Equipment Division, "VR–3S Recloser 15–38kV," Descriptive Bulletin 38–741–27, Jun. 1999.

* cited by examiner

*Primary Examiner*—Stephen W. Jackson
(74) *Attorney, Agent, or Firm*—Woodcock Washburn LLP

(57) ABSTRACT

A recloser is monitored and adaptively controlled so that it will operate in a manner responsive to prevailing conditions as either a recloser or as a sectionalizer. The prevailing conditions that are determined are those that will affect the operation of the recloser, such as the number of faults, the fault current versus time, or the presence of reverse power.

12 Claims, 3 Drawing Sheets

ADAPTIVE RECLOSER/SECTIONALIZER

FIELD OF THE INVENTION

The present invention relates in general to the field of electrical power distribution systems. More particularly, the present invention relates to reclosers and sectionalizers.

BACKGROUND OF THE INVENTION

A common problem in almost any electrical power distribution system is a momentary disruption of electrical service, such as might be caused by a momentary short circuit. For example, power lines strung between poles could swing under wind loading, momentarily touching each other or a grounded conductor. Things may fall across exposed wires, arcing could occur, or other transitory events could cause momentary power line short circuits or current surges which could burn out a fuse or trip a circuit breaker. Most of these faults are self correcting and do not require permanent fuse or circuit breaker protection because they terminate quickly. If a fuse should burn out or a circuit breaker should trip, the power line would be open and customers would be deprived of their electrical power. Service calls to replace fuses or reset circuit breakers would then be required, thus escalating the customer's costs.

A recloser is a fault-interrupting device used to sense current, voltage, and/or frequency and isolate faulted portions of distribution feeders. A recloser is operated by a recloser control device, which can be an electronic control circuit. Reclosers are inserted into power lines to protect a power distribution system.

More particularly, reclosers are electromechanical devices, similar to circuit breakers. Reclosers are distributed at one or more locations along a power line, typically upline from a fuse. When a fault condition is detected by the recloser controller, the recloser will begin to timeout. In other words, the recloser controller will trip open the recloser if the fault condition has not cleared itself during a fixed time interval, where the time interval is a function of current. Then, as the name suggests, the recloser will close, and if the fault condition has been cleared, power service will resume. If, however, the fault condition has not been cleared, the recloser controller will again trip open the recloser after a second fixed time interval. If, after a predetermined number of reclose operations, the fault condition has not been cleared, the recloser controller will permanently lockout the recloser (i.e., permanently open the circuit). The circuit then remains open until the system is repaired and/or the fault condition is eliminated.

A recloser senses the peak value of the current conducted and interrupting its flow by opening or tripping a recloser before a fuse blows. After an interval, the recloser closes, thereby restoring power to the system where it remains closed until the next fault is sensed.

It must also be recognized that some faults which occur on a power distribution line are temporary, such as those caused by a branch momentarily falling against the line. Some faults are of a more permanent nature such as those caused by a line falling to the ground. As a consequence, reclosers are programmed so that they will trip a limited number of times within a short duration before locking open.

At some magnitude of fault current it is desirable to have the recloser open immediately to protect the line rather than following a time current characteristic. At intermediate fault levels it may be desirable from the power distribution standpoint to delay opening the recloser to allow the fault to clear itself or a fuse to operate. Many reclosers have alternate time current characteristics which achieve this goal.

Conventional reclosers for three-phase systems open all three phases at the same time upon detection of a fault on any one phase. Other three-phase systems implement three single-phase reclosers, one on each phase. A recloser can interrupt high currents.

A recloser controller provides the intelligence that enables a recloser to sense overcurrents, select timing operations, time the tripping and reclosing functions, and lockout.

A sectionalizer is a load or no-load opening device that is used to isolate portions of an electrical network. A sectionalizer cannot interrupt high currents, it can only open and close, like a switch. A sectionalizer is typically implemented in series with one or more reclosers and typically operates after a recloser has opened for a fault and there has been a predetermined dead time, thereby allowing the sectionalizer to open before the recloser closes.

It is difficult to coordinate several (e.g., more than three) reclosers in a row. Accordingly, it would be desirable provide recloser control that can adaptively control a recloser to function as a recloser or as a sectionalizer, depending on the currently prevailing conditions, in order to assist in coordination.

SUMMARY OF THE INVENTION

The present invention is directed to systems and methods for setting a recloser to act as a recloser or a sectionalizer, in response to prevailing conditions. The prevailing conditions that are determined are those that will affect the operation of the recloser, such as the number of faults, the fault current versus time, or the presence of reverse power.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to systems and methods for adaptively controlling a recloser so that it will operate in a manner responsive to prevailing conditions as either a recloser or as a sectionalizer.

Electrical transmission lines and power generation equipment must be protected against insulation faults and consequent short circuits, which could cause a collapse of the power system, serious and expensive equipment damage, and personal injury. Further, extensive power outages may cause angst among consumers that expect reliable and trustworthy utility service. It is the function of the fault protection devices such as fuses and protective relays to assist in the isolation of line faults and initiate isolation by tripping circuit breakers.

Automatic recloser devices are used in electrical distribution systems to protect high voltage power lines. Such devices are usually mounted to the poles or towers that suspend power lines above the ground. However, use with below ground systems is also known. The recloser device is used to minimize power distribution interruptions caused by transients or faults. A sectionalizer, on the other hand, acts as a switch to isolate portions of an electrical network.

Typically, during a system disturbance, large increases in current, due to faults, will occur. Sensing a current increase, the recloser will open, thereby cutting off current flow in order to protect distribution system components and other equipment connected to the distribution system. Because many fault conditions are temporary, the recloser is designed to close after a short period of time, thereby establishing normal current flow. For example, during a thunderstorm, if lightning were to strike the distribution system, the power to one's home may be disrupted for a few seconds causing lights and appliances to turn OFF (recloser opening), then ON (recloser closing). Once the recloser closes, if it senses the continued presence of increased current, it will again open. Such cycling between open and closed may occur three times before the recloser remains open.

Figure 1:
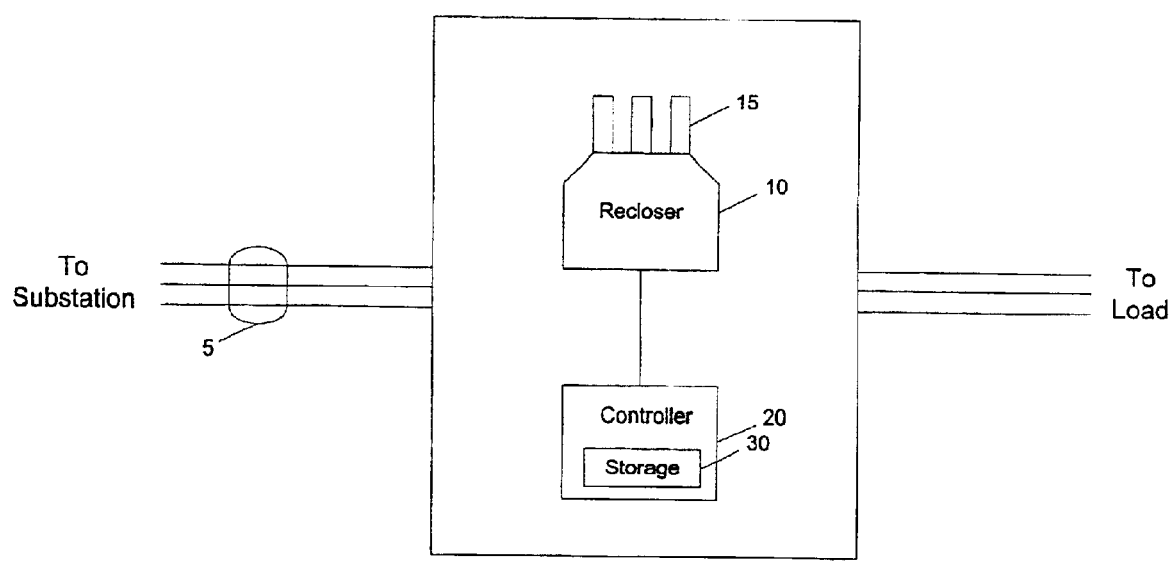
FIG. 1 is a simplified schematic diagram of a system in which the present invention may be embodied.

A simplified schematic diagram of a system in which the present invention may be embodied is shown in FIG. 1. A recloser 10 is coupled to a power line 5 (e.g., between a substation and a load), and is operated by a recloser control device 20 such as an electronic control circuit. The power line 5 is a three-phase power line. The recloser 10 comprises three poles 15. Each pole 15 is connected to an associated wire on the power line 5, thereby being energized by an associated phase. The recloser could monitor system currents and voltages.

The basic components of an automatic recloser 10 are a high-speed circuit breaker, overcurrent protection, trip logic, and automatic closing logic with an operation counter. When an overcurrent of sufficient magnitude (i.e., greater than a predetermined amount of current) flows through the recloser 10, the tripping action is initiated and a circuit interrupting contact within the pole 15 opens with an operation counter advancing one count. After a preset time delay, the recloser contacts are automatically closed, thereby re-energizing the line 5. If the fault persists, this tripping and reclosing sequence is repeated a predetermined number of times, as set by the controller 20, until a lockout function is initiated. If the fault was transient and cleared during any period when the recloser 10 was open, then the recloser 20 will remain closed after a short time delay reset to its original condition ready for the next operation.

An exemplary recloser for use with the present invention is the VR-3S recloser manufactured and distributed by ABB Power T&D Company, Inc., Raleigh, N.C. Magnetic actuators open and close the recloser's main contacts.

The recloser 10 is controlled by microprocessor-based controller 20 that contains software. There are two basic design areas that make up a microprocessor-based controller 20. The physical elements, such as integrated circuits, resistors, capacitors, displays, switches, and so forth, are called "hardware". Once constructed, they are not readily changeable. The second basic design area in the microcomputer includes computer programs and documentation. These elements are called "software" since they are readily changeable.

A microcomputer based on a microprocessor and associated memories and interfacing components is used in the recloser controller 20 to process input signals in a manner appropriate for recloser control. The microprocessor performs the various arithmetic and logic functions of the control. In particular, the required logic circuits as well as capabilities for servicing are typically included A power supply is typically provided in a recloser control system and provides power to other components of the control system and includes power storage means to supply power when the protected lines are interrupted. A secondary overcurrent trip circuit in the control functions independently of the microcomputer when the microcomputer is disabled to effect a trip operation of the recloser. A protective input network protects the controller's low power devices from the hostile environment of the power distribution system and scaling means are used to allow the microcomputer and associated circuitry to function with more precision in the range of input signal magnitudes where precision is desirable and to allow the control to function with a limited number of components over a vide range of input signals.

Storage or memory 30 is provided for temporarily and/or permanently storing data. For use with a recloser 10, for example, this data would include line current magnitudes and command information such as multiple time-current characteristic curves and protection setting groups, as further described below. The memory 30 can be random access memory (RAM) or read only memory (ROM) or any other type of memory. ROM is preferably electrically programmable for easy modification and is used for storing programming information. The storage 30 can be internal to the controller 20, as shown, or be located external to the controller 20.

The front panel of a recloser controller 20 may include a display for displaying information. A keyboard or other input device may be used for entering information. Indicator lamps provide status information such as recloser open, recloser closed, control lock out, above minimum trip, malfunction and lock in.

Through the use of the switches and keyboard mentioned above, the operations of the device can be controlled by command information. Typical command information for a recloser controller includes first time current characteristics for phase and ground currents which usually result in the more rapid tripping of the recloser 10, and second time current characteristics for phase and ground currents which usually result in the recloser 10 remaining closed longer under fault conditions. Other command information includes minimum trip levels for phase and ground currents which in a recloser controller begins the timing process in accordance with the time current characteristic, number of shots to lock out under phase and ground faults, and number of times which a given time current characteristic will be followed. Further command information may include a reset time interval which determines the duration which a counter recording the shot number will retain that information under non-fault conditions, and multiple reclose intervals which determine the time that the recloser 10 will remain open. Additional command information may include a high current constant time feature which allows the recloser 10 to remain closed only for a fixed duration under certain magnitudes of fault currents. Thus, if there is a fault, the line 5 is opened for a short period of time. At an end of a given time period following the opening of the line 5, the recloser 10 closes the line 5. If the abnormal condition persists, the recloser 10 again opens and closes the line 5. As described herein, the command information can also direct the recloser 10 to function as either a recloser or as a sectionalizer.

According to the present invention, the recloser controller monitors the line for events such as faults or fault current versus time, for example, and in response to the events, sets a recloser to continue functioning as a recloser or change its functioning to that of a sectionalizer. Thus, for example, a recloser is enabled in a "recloser" mode for normal operation until a fault, or series of faults, is detected, and then the recloser controller activates a "sectionalizer" mode on the recloser. In "sectionalizer" mode, the recloser operates as a sectionalizer; that is, it cannot interrupt high currents and it merely opens and closes like a switch. In this manner, coordination among multiple reclosers in an electrical power distribution system is more easily obtained.

Figure 2:
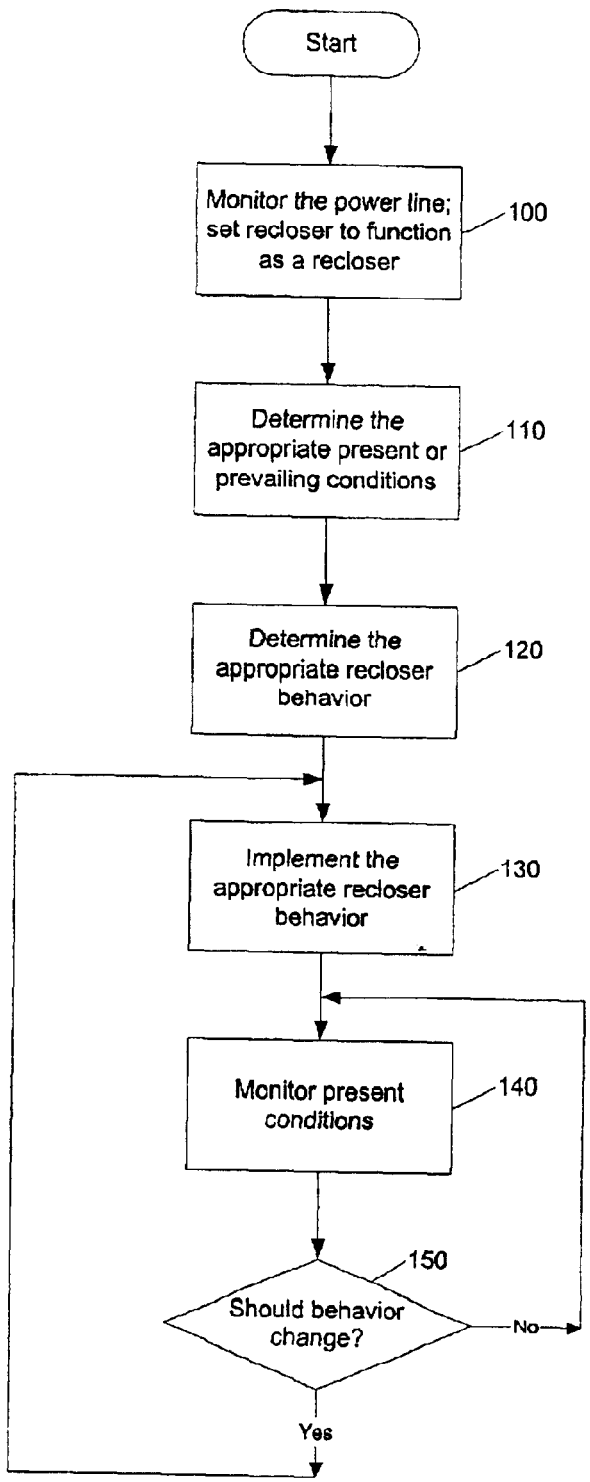
FIG. 2 is a flow chart of an exemplary method of operation in accordance with the present invention.

FIG. 2 is a flow chart of an exemplary method of operation in accordance with the present invention. At step 100, during power delivery, the recloser 10 monitors the power line 5, and is set to function as a recloser. At step 110, the present or prevailing conditions are determined The present or prevailing conditions that are determined are those that will affect the operation of the recloser, such as the number of faults, the fault current versus time, or the presence of reverse power.

At step 120, the appropriate recloser behavior is determined based on the prevailing conditions. The appropriate recloser behavior is then implemented at step 130. The present or prevailing conditions are continuously monitored, at step 140, to determine if the recloser behavior should be changed, as determined at step 150. If the behavior should change, the new behavior is determined and implemented with processing continuing at step 130. If the behavior should not change, the conditions are monitored, with processing continuing at step 140. The prevailing conditions are monitored at predetermined intervals (of time, for example) or at other events, which can be programmed by a technician or customer.

Figure 3:
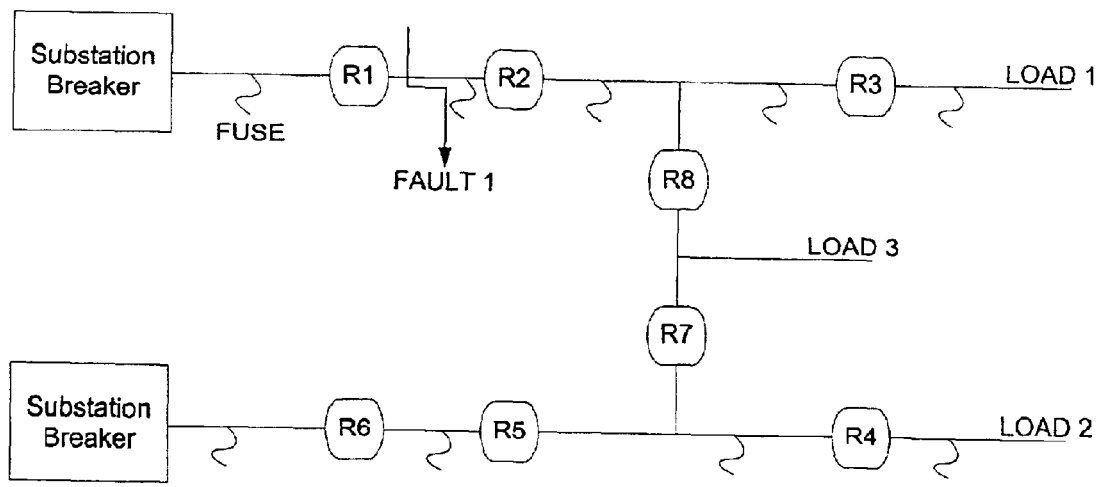
FIG. 3 is a simplified schematic diagram of an exemplary circuit for use in describing the present invention.

FIG. 3 is a simplified schematic diagram of an exemplary circuit for use in describing the present invention. FIG. 3 shows a typical configuration for two feeders protected by reclosers. Reclosers 1, 2, and 3 (designated R1, R2, and R3, respectively) protect the feeder serving Load 1. Reclosers 4, 5, and 6 (designated R4, R5, and R6, respectively) protect the feeder serving Load 2. Reclosers 5, 6, and 7 (R7) protect the feeder serving Load 3. Recloser 8 (R8) is a tie point and is normally open (NOP). In a normal utility operation, a fault at Fault 1 will be cleared by an operation of Recloser 1. In this case, it is possible for the system to initiate load restoration to Load 1 by opening Recloser 2, and closing Recloser 8 at the NOP (Normal Open Point). This will restore the power to Load 1 and Load 3.

An alternative load restoration scheme is available to Load 1 since it is often difficult to coordinate more than three reclosers on a feeder due to the time interval between overcurrent protection curves. The alternate path for restoration of power to Load 1 is from Recloser 6→Recloser 5→Recloser 7→Recloser 8→Recloser 3→Load 1. Therefore, it would be desirable to have Recloser 7 reconfigured as a sectionalizer, because there are more than three reclosers in series for load restoration to Load 1.

By having a recloser (e.g., R7) dynamically change its function to that of an electronically controlled sectionalizer, should a second fault occur between the sectionalizer R7 and the next down line protection device R8, then the sectionalizer R7 shall still open in response to the counting of R5 operations. By having R7 operate, time is saved in locating faults as the device normally associated in isolating that fault, R7, will have operated. The automatic function is achieved while maintaining appropriate coordination. This reconfiguration can be initiated through SCADA, dial-up modem, radio transmitter/receiver, an internal pre-programmed alternate setting group activated by reverse power flow (32P), or through peer-to-peer communications from other reclosers, from a recloser to a sectionalizer or vice versa through a communication node.

The present invention is advantageous to electric utilities for maximizing protection of their load restoration schemes and minimizing the liability of exposing their distribution system to extraordinary coordination limits on three or more reclosers in series with a load that needs restoration.

It should be understood any of a number of microprocessors could be used to the same effect described above. Each manufacturer's family requires that the peculiarities of their devices be satisfied and in the microcomputer portion of the recloser controller 20, and it would be impossible to go into sufficient detail to describe the functioning control and be sufficiently general to adequately describe the use of alternative devices. One skilled in the art could readily amplify and modify the description given to make them applicable to the devices of other manufacturers by reading the normal technical literature provided by the manufacturer of another device. Moreover, it would be extremely confusing to attempt to describe all the minor details contained within the software and only the more general software modules and programs are described since one skilled in the art could readily flesh out the skeleton provided An exemplary control unit is the PCD2000 power control device manufactured and distributed by ABB Power T&D Company, Inc., Raleigh, N.C. The control device can provide an interface for remote communication with SCADA systems using MODBUS RTU, MODBUS ASCII, and DNP 3.0 protocols. The controller can be programmed to implement other protocols. Ports are available for external links through a radio, modem, or direct fiber optic communications, for example.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method for controlling a recloser for an electrical power line, comprising:

determining a present condition of at least one feature;

determining a behavior function for the recloser based on the present condition;

continuously monitoring the present condition at user programmable events;

changing the behavior function responsive to the monitoring; and controlling the recloser as a sectionalizer when the behavior function is a sectionalizer function, and otherwise controlling the recloser as a recloser.

2. The method according to claim 1, wherein monitoring the present condition comprises monitoring at predetermined intervals.

3. The method according to claim 1, wherein the at least one feature comprises a number of faults.

4. The method according to claim 1, wherein the at least one feature comprises reverse power.

5. A recloser control system for an electrical power line, comprising:

a recloser;

a memory comprising a recloser function and a sectionalizer function; and a recloser controller coupled to the recloser and the memory for continuously monitoring, at user programmable events, a present condition of a feature associated with the recloser function and the sectionalizer function and for controlling the recloser in accordance with the recloser function and the sectionalizer function and the present condition.

6. The recloser control system according to claim 5, wherein the feature comprises reverse power.

7. The recloser control system according to claim 5, wherein the feature comprises a number of faults.

8. The recloser control system according to claim 5, wherein the recloser controller comprises the memory.

9. A computer-readable medium having computer-executable instructions for performing steps comprising:

determining a present condition of at least one feature;

determining a behavior function for the recloser based on the present condition;

continuously monitoring the present condition at user programmable events;

changing the behavior function responsive to the monitoring; and controlling the recloser as a sectionalizer when the behavior function is a sectionalizer function, and otherwise controlling the recloser as a recloser.

10. The computer-readable medium according to claim 9, wherein monitoring the present condition comprises monitoring at predetermined intervals.

11. The computer-readable medium according to claim 9, wherein the at least one feature comprises a number of faults.

12. The computer-readable medium according to claim 9, wherein the at least one feature comprises reverse power.

* * * * *

UNITED STATES PATENT AND TRADEMARK OFFICE
CERTIFICATE OF CORRECTION

PATENT NO. : 6,778,370 B1
DATED : August 17, 2004
INVENTOR(S) : LaPlace et al.

It is certified that error appears in the above-identified patent and that said Letters Patent is hereby corrected as shown below:

Column 4,
Line 2, after "included" insert -- . --.
Line 16, delete "vide" and insert -- wide --.

Column 5,
Line 16, after "determined" insert -- . --.

Column 6,
Line 26, after "provided" insert -- . --.

Signed and Sealed this

Twenty-seventh Day of September, 2005

JON W. DUDAS
*Director of the United States Patent and Trademark Office*